United States Patent
Woolley, Jr. et al.

(10) Patent No.: US 12,406,526 B2
(45) Date of Patent: Sep. 2, 2025

(54) INDIRECTLY ACCESSING SAMPLE DATA TO PERFORM MULTI-CONVOLUTION OPERATIONS IN A PARALLEL PROCESSING SYSTEM

(71) Applicant: NVIDIA CORPORATION, Santa Clara, CA (US)

(72) Inventors: John Clifton Woolley, Jr., San Jose, CA (US); John Tran, Denver, CO (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/365,634

(22) Filed: Mar. 26, 2019

(65) Prior Publication Data

US 2019/0220731 A1    Jul. 18, 2019

Related U.S. Application Data

(63) Continuation of application No. 14/951,588, filed on Nov. 25, 2015, now Pat. No. 10,255,547.

(Continued)

(51) Int. Cl.
*G06V 40/16* (2022.01)
*G06N 3/045* (2023.01)
(Continued)

(52) U.S. Cl.
CPC ........... *G06V 40/172* (2022.01); *G06N 3/045* (2023.01); *G06V 10/50* (2022.01); *G06V 10/56* (2022.01); *G06V 10/95* (2022.01); *G06V 30/142* (2022.01)

(58) Field of Classification Search
CPC ........ G06N 3/0454; G06N 3/04; G06N 3/126; G06N 3/08; G06N 3/084; G06N 3/02;
(Continued)

(56) References Cited

U.S. PATENT DOCUMENTS 5,581,778 A * 12/1996 Chin ..................... G06F 9/3887
                                                            712/245
6,188,797 B1     2/2001 Moledina et al.
(Continued)

FOREIGN PATENT DOCUMENTS

| CN | 101375311 A | 2/2009 |
| CN | 103885752 A | 6/2014 |
| KR | 10-1391465 B1 | 5/2014 |

OTHER PUBLICATIONS

Craig M. Wittenbrink and Arun K. Somani. "Cache tiling for high performance morphological image processing" Machine Vision and Applications vol. 7, pp. 12-22(1993) "https://link.springer.com/article/10.1007/BF01212412".*

(Continued)

*Primary Examiner* — Xilin Guo
(74) *Attorney, Agent, or Firm* — Davis Wright Tremaine LLP

(57) ABSTRACT

In one embodiment of the present invention, a convolution engine configures a parallel processing pipeline to perform multi-convolution operations. More specifically, the convolution engine configures the parallel processing pipeline to independently generate and process individual image tiles. In operation, for each image tile, the pipeline calculates source locations included in an input image batch based on one or more start addresses and one or more offsets. Subsequently, the pipeline copies data from the source locations to the image tile. The pipeline then performs matrix multiplication operations between the image tile and a filter tile to generate a contribution of the image tile to an output matrix. To optimize the amount of memory used, the pipeline creates each image tile in shared memory as needed. Further, (Continued)

to optimize the throughput of the matrix multiplication operations, the values of the offsets are precomputed by a convolution preprocessor.

37 Claims, 9 Drawing Sheets

Related U.S. Application Data

(60) Provisional application No. 62/087,681, filed on Dec. 4, 2014.

(51) Int. Cl.
*G06V 10/50* (2022.01)
*G06V 10/56* (2022.01)
*G06V 10/94* (2022.01)
*G06V 30/142* (2022.01)

(58) Field of Classification Search
CPC ...... G06N 3/045; G06N 3/0464; G06N 20/10; G06K 9/4652; G06K 9/228; G06K 9/00288; G06K 9/00979; G06K 9/4642; G06K 9/46; G06K 9/00; G06K 9/22; G06F 12/00; G06F 9/3552; G06F 17/16; G06F 17/153; G06F 12/0207; G06F 2207/4824; G06F 2201/815; G06F 3/064; G06F 9/345; G06F 12/0897; G06F 15/8023; G06F 15/801; G06F 18/217; G06F 17/18; G06F 12/0284; G06F 12/0607; G06F 9/30036; G06F 9/3012; G06F 17/15; G06F 2212/302; G06F 7/523; G06F 3/0659; G06T 1/20; G06T 2207/20084; G06T 1/60; G06T 15/005; G06T 5/20; G06T 5/002; G06T 7/11; G06T 2207/10016; G06T 5/50; H04N 19/176; H04N 19/105; H04N 9/67; H04N 9/68; G06V 10/82; G06V 10/454; G06V 10/50; G06V 10/56; G06V 10/95; G06V 30/142; G06V 10/25
See application file for complete search history.

(56) References Cited

U.S. PATENT DOCUMENTS

| | | | |
|---|---|---|---|
| 7,912,889 B1 * | 3/2011 | Juffa | G06F 17/16 |
| | | | 708/607 |
| 2002/0114527 A1 | 8/2002 | Horie | |
| 2002/0154116 A1 * | 10/2002 | Nakatsuka | G06T 15/50 |
| | | | 345/426 |
| 2007/0047802 A1 | 3/2007 | Puri | |
| 2007/0078661 A1 * | 4/2007 | Sriram | G10L 19/0212 |
| | | | 704/E19.02 |
| 2007/0292047 A1 * | 12/2007 | Jiao | G06T 15/04 |
| | | | 382/279 |
| 2010/0050055 A1 | 2/2010 | Tanaka et al. | |
| 2010/0215253 A1 * | 8/2010 | Yamamoto | G06N 3/08 |
| | | | 382/156 |
| 2012/0221617 A1 * | 8/2012 | Subbarao | G06F 17/16 |
| | | | 708/404 |
| 2013/0232322 A1 * | 9/2013 | Fetterman | G06F 9/3887 |
| | | | 712/225 |
| 2014/0279894 A1 * | 9/2014 | Loewenstein | G06F 16/904 |
| | | | 707/634 |
| 2016/0062947 A1 | 3/2016 | Chetlur et al. | |

OTHER PUBLICATIONS

Kumar Chellapilla, Sidd Puri, Patrice Simard, et al. High performance convolutional neural networks for document processing. In Workshop on Frontiers in Handwriting Recognition, 2006.

Guangming Tan, Linchuan Li, Sean Treichler, Everett Phillips, Yungang Bao, and Ninghui Sun. Fast implementation of DGEMM on Fermi GPU. In Supercomputing 2011, SC '11, pp. 35:1-35:11, New York, NY, USA, 2011. ACM.

Henry S. Warren. Hacker's Delight. Addison-Wesley Professional, 2002.

Im2col functional description http://www.mathworks.com/help/images/ref/im2col.html.

Chetlur, S., et al. "cuDNN: Efficient Primitives for Deep Learning" Oct. 9, 2014 eprint arXiv:1410.0759 https://arxiv.org/pdf/1410.0759v2.pdf {sections 3-3.1) 9 pages.

Chetlur et al., "cuDNN: Efficient Primitives for Deep Learning," Dec. 18, 2014, 10 Pages.

* cited by examiner

INDIRECTLY ACCESSING SAMPLE DATA TO PERFORM MULTI-CONVOLUTION OPERATIONS IN A PARALLEL PROCESSING SYSTEM

CROSS-REFERENCE TO RELATED APPLICATIONS

This application is a continuation of the U.S. patent application titled, "INDIRECTLY ACCESSING SAMPLE DATA TO PERFORM MULTI-CONVOLUTION OPERATIONS IN A PARALLEL PROCESSING SYSTEM," filed on Nov. 25, 2015 and having Ser. No. 14/951,588, which claims benefit of the U.S. Provisional patent application titled, "MULTI-CONVOLUTION ENGINE," filed on Dec. 4, 2014, having Ser. No. 62/087,681. The subject matter of this related application is hereby incorporated herein by reference.

BACKGROUND OF THE INVENTION

Field of the Invention

Embodiments of the present invention relate generally to computer processing and, more specifically, to indirectly accessing sample data to perform multi-convolution operations in a parallel processing system.

Description of the Related Art

Convolutional Neural Networks (CNNs) are oftentimes used to efficiently and reliably solve a wide range of inference problems. For example, CNNs are included in many image recognition, handwriting recognition, and speech translation algorithms. In operation, CNNs can substantially reduce error rates compared to many simpler machine learning techniques. However, the time required for CNNs to execute usually exceeds the time required for simpler machine learning techniques to execute. Consequently, time-sensitive applications may be structured to implement simpler machine learning techniques at the expense of producing inferior results.

As a general matter, the time required for a CNN to execute is dominated by the time required for the CNN to perform "multi-convolution" operations. A multi-convolution operation is a generalized form of a multi-dimension convolution operation between sample data, such as an image, and a filter. The multi-convolution operation is oftentimes implemented using a stencil-based technique or using Fast Fourier Transforms (FFTs). While stencil-based techniques and FFT-based techniques may enable some multi-convolution operations to be implemented more efficiently, such techniques are normally unable to allow multi-convolution operations to execute efficiently over the full range of dimensions and additional parameters typically associated with standard CNNs.

In this regard, a CNN typically includes multiple "convolution layers," where each convolution layer performs convolution operations across multiple dimensions of a sample data batch and multiple dimensions of a filter stack. For example, for a four dimensional CNN involving image samples, the sample data batch is a batch of images, and the four dimensions of the image batch include the image width, the image height, the number of color planes per image, and the number of images in the image batch. The four dimensions of the filter stack include the filter width, the filter height, the number of feature planes per filter, and the number of filters in the filter stack. Additional parameters may further customize the multi-convolution operations. For example, a horizontal filter stride and a vertical filter stride may reduce the overall computational load by decreasing the size of the subset of pixels involved in the convolution operation. Notably, the dimensions of the image batch and the filter stack as well as the additional parameters often vary between convolution layers.

Stencil-based techniques are typically tuned to optimize multi-convolution operations across a relatively small subset of dimensions and parameters. However, the performance of stencil-based techniques across other dimensions and parameters usually exceeds the time required to execute simpler machine learning techniques. Consequently, as alluded to above, the time required to execute many CNNs using stencil-based techniques is typically unacceptably long. As also alluded to above, the time required to execute many CNNs using FFT-based approaches also varies dramatically based on the values of the parameters.

One approach to reducing the time required to execute CNNs across a wide range of parameter values incorporates the observation that convolution is a linear operator and therefore may be lowered onto matrix multiplication. Such an approach requires expanding the sample data into the required matrix form. More specifically, in such implementations, the convolution engine converts the image batch into a column-major image matrix and expresses the filter stack as a filter matrix. Subsequently, the convolution engine performs matrix multiplication operations between the image matrix and the filter stack. Notably, the dimensions of the image matrix and the filter matrix correspond to products of subsets of the independent parameters of the CNN instead of the individual parameters. As a result, matrix-based techniques exhibit relatively uniform performance characteristics across the different input dimensions and parameters. Further, because libraries of code written for each of many types of processing units include optimized matrix multiplication routines, the time required to execute a CNN via the foregoing approach may be significantly less than the time required to execute the CNN using stencil-based or FFT-based techniques.

One drawback to implementing such matrix-based operations in a convolution engine is that, as part of expanding the image batch to properly set up the matrix multiplication operations, the convolution engine has to copy the image data to multiple locations in the image matrix. Consequently, the size of the image matrix may increase to the point where the available memory is completely consumed. For example, suppose that the image width were W, the image height were H, the number of color planes per image were C, and the number of images in the image batch were N. Further, suppose that the dimensions of each of the output images were (P×Q). In such a scenario, the dimensions of the image matrix would be (N×P×Q)×(C×R×S). In many systems, the space needed to store image matrices of this size can exceed the available space in memory.

In an effort to reduce memory use while executing a multi-convolution via an optimized matrix multiplication routine, a tile-based convolution engine can be implemented that configures a parallel processing pipeline to independently expand and process individual tiles of the image matrix. In such an approach, the parallel processing pipeline performs address calculations to expand each tile of the image matrix in shared memory on an as-needed basis. The parallel processing pipeline then performs matrix multiplication operations between the image tile and the filter stack. Because the expanded image matrix is expanded directly into shared memory a tile at a time, the matrix is never stored in its entirety, and the amount of parallel processing memory used can be dramatically reduced compared to typical matrix-based convolution engines.

One drawback of tile-based convolution engines, however, is that calculating the address sequence needed to load the image data in the correct order to expand a tile of the expanded image matrix involves performing a sequence of dependent integer operations. This sequence of integer operations typically requires a relatively large number of clock cycles to execute. Oftentimes, the number of clock cycles required to perform the integer operations can exceed the number of clock cycles required to perform the matrix multiplication operations. As a result, the benefits of the optimized matrix multiplication routine are not fully realized and the overall time to execute CNNs may be unacceptably long.

More specifically, each loop iteration in a matrix multiplication is typically sized for a certain number of floating point math operations to cover the memory latency of the loads. For example, one implementation could have 100 math operations for 10 memory loads. Typically, those 10 memory loads execute relatively quickly and will return as the 100 math operations are finishing. However, if each such memory operation takes 10 extra integer operations, each dependent on the previous operation with a 10 cycle latency, then the cost to generate the 10 addresses is 100 cycles— matching the number of math operations before accounting for the memory latency to service those memory loads. If those memory loads take on average 10 cycles themselves, then we have now taken 200 cycles to load memory versus 100 cycles to calculate the floating point math operations, leading to 100 cycles in which no useful math is available to cover the memory latency, hurting overall efficiency.

As the foregoing illustrates, what is needed in the art is a more effective approach to performing multi-convolution operations.

SUMMARY OF THE INVENTION

One embodiment of the present invention sets forth a computer-implemented method for performing a multi-convolution operation. The method includes selecting a first start address based on a first destination address included in a first image tile that is stored in a first memory; identifying a first offset based on the first destination address; computing a first source address included in an image batch that is stored in a second memory based on the first start address and the first offset; copying data from the first source address to the first destination address; and after copying the data, performing one or more matrix multiplication operations between the first image tile and a first filter tile.

Further embodiments provide, among other things, a non-transitory computer-readable medium and a system configured to implement the method set forth above.

One advantage of the disclosed techniques is that applications may perform multi-convolution operations via an optimized matrix multiplication routine while optimizing parallel processing memory usage. In particular, precomputing offsets reduces the latency associated with calculating addresses while expanding each image tile of a virtual image matrix on the fly.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
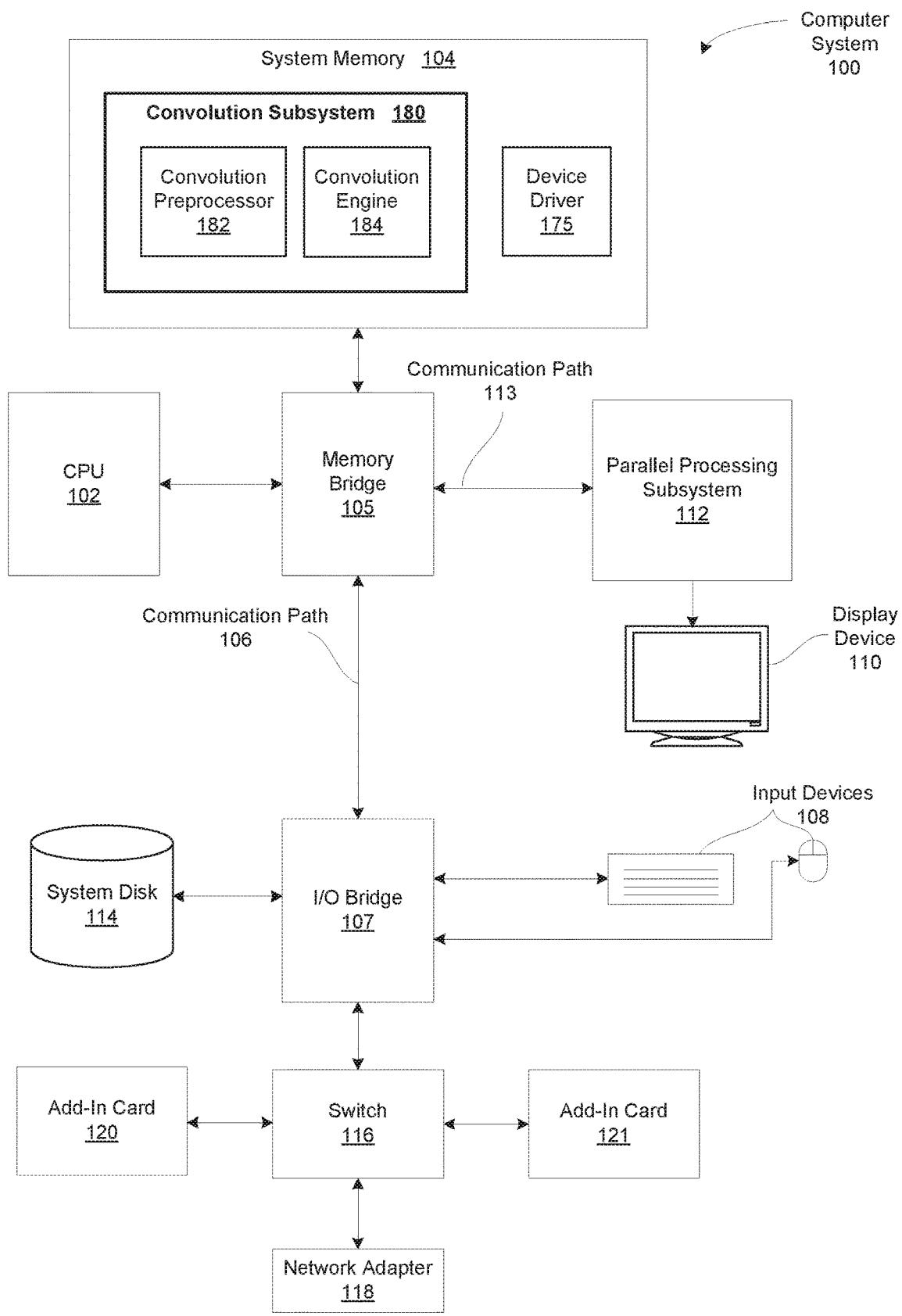
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations.

As shown, the system memory 104 includes at least one device driver 175 and a convolution subsystem 180. The device driver 175 is configured to manage the processing operations of the one or more PPUs within parallel processing subsystem 112. The convolution subsystem 180 includes, without limitation, a convolution preprocessor 182 and a convolution engine 184. The convolution preprocessor 182 performs computations designed to increase the efficiency of the convolution engine 184 and the convolution engine 184 is configured to perform multi-convolution operations.

The convolution preprocessor 182 may execute on the CPU 102, the parallel processing subsystem 112, or any combination thereof. The convolution engine 184 executes on the parallel processing subsystem 112, and the parallel processing subsystem 112 executes an optimized matrix multiplication routine included in a library. Notably, such multi-convolution operations dominate the time required to execute Convolutional Neural Networks (CNN). Although not shown, the system memory 104 also includes any number of software applications that execute on the CPU 102, may issue commands that control the operation of the PPUs, and may leverage the convolution subsystem 180 to efficiently execute CNNs.

In various embodiments, the parallel processing subsystem 112 may be integrated with one or more other the other elements of FIG. 1 to form a single system. For example, the parallel processing subsystem 112 may be integrated with the CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
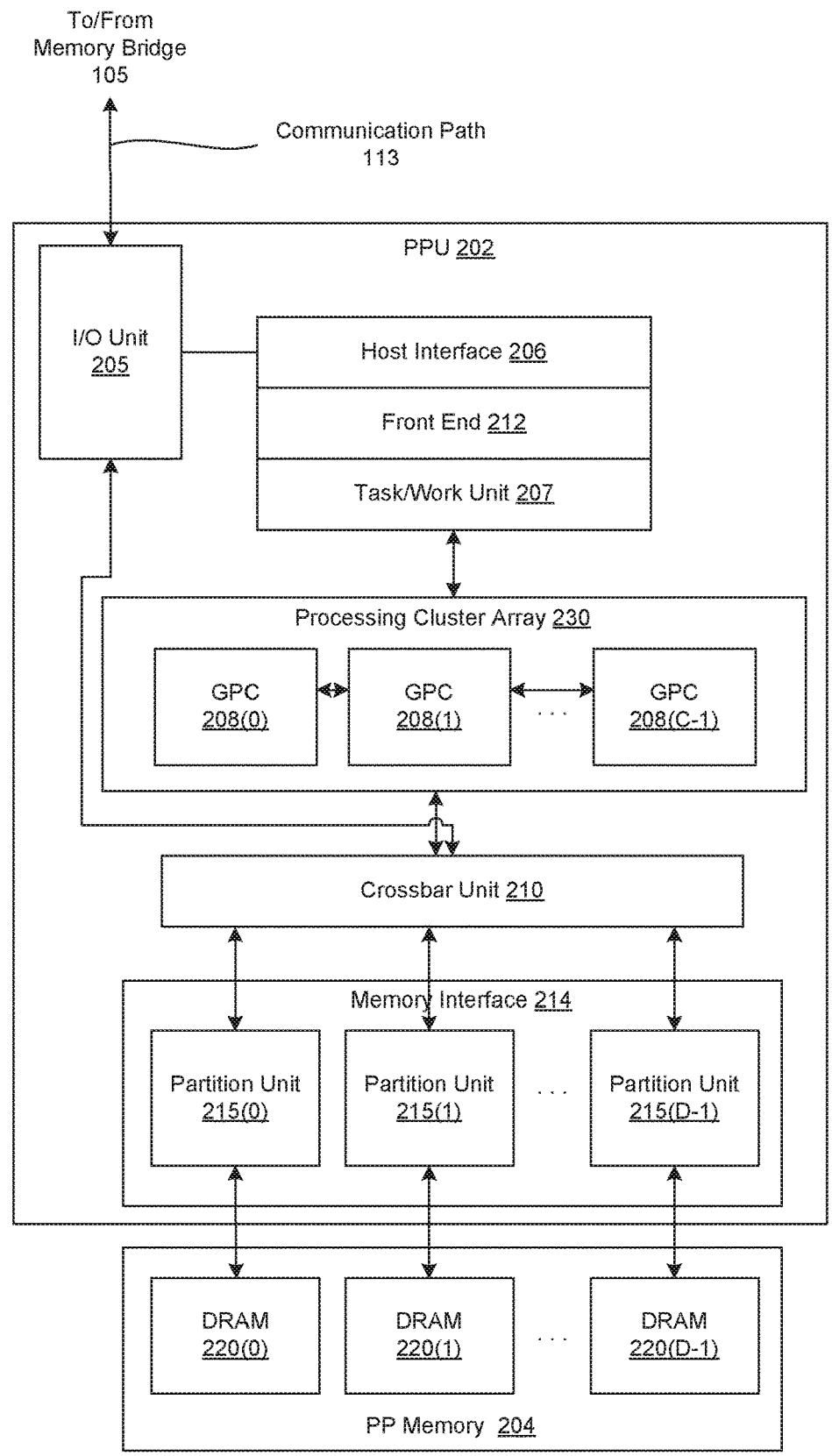
FIG. 2 is a block diagram of a parallel processing unit included in the parallel processing subsystem of FIG. 1, according to various embodiments of the present invention.

FIG. 2 is a block diagram of a parallel processing unit (PPU) 202 included in the parallel processing subsystem 112 of FIG. 1, according to various embodiments of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 175 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
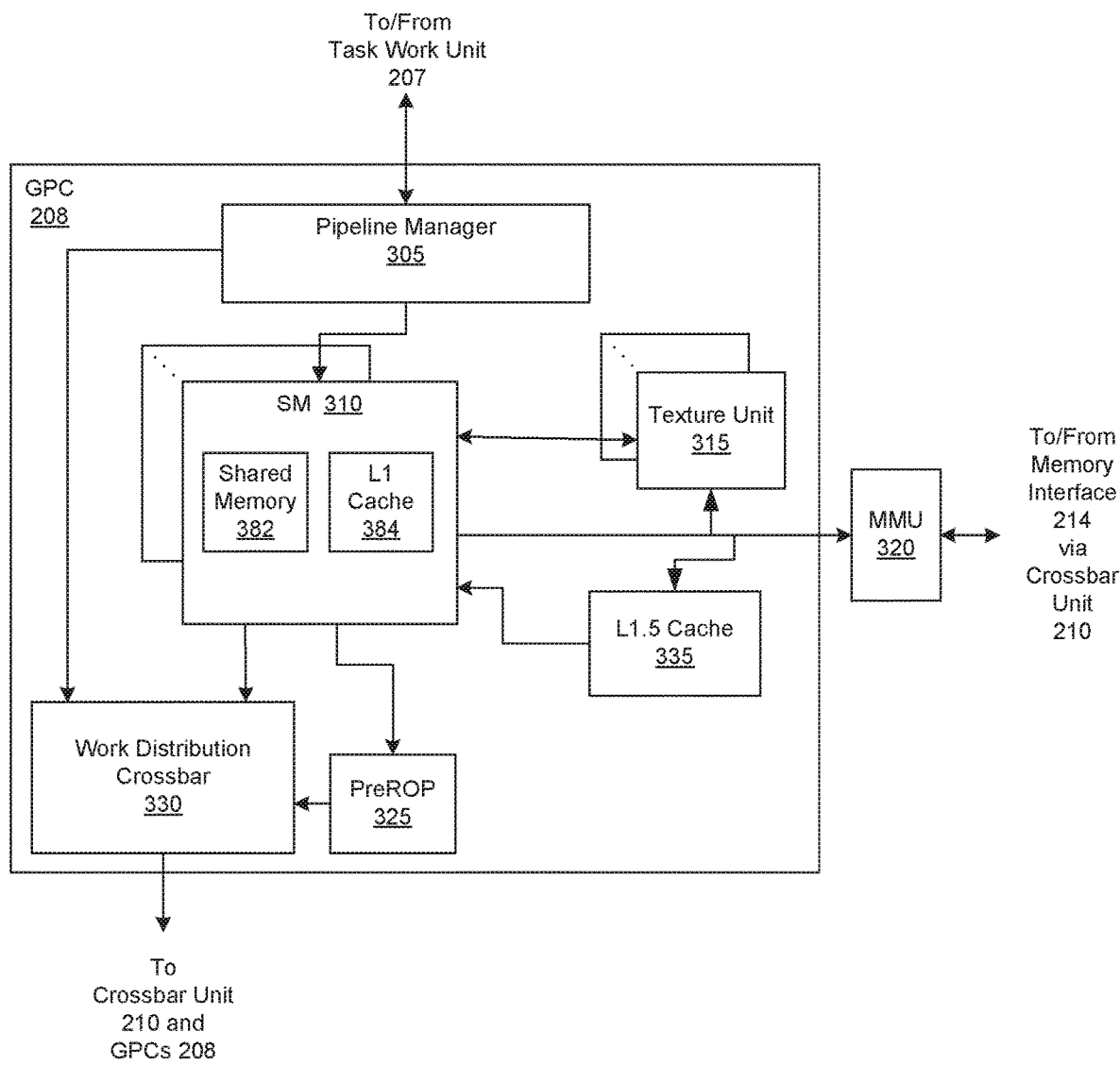
FIG. 3 is a block diagram of a general processing cluster included in the parallel processing unit of FIG. 2, according to various embodiments of the present invention.

FIG. 3 is a block diagram of a GPC 208 included in PPU 202 of FIG. 2, according to various embodiments of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown in FIG. 3), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating-point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

As shown, each SM 310 includes, without limitation, a shared memory 382 and a level one (L1) cache 384. The shared memory 382 is typically a relatively small section of static random-access memory (SRAM) that is local to the SM 310. One or more portions of the shared memory 382 are shared amongst the threads in a CTA. The L1 cache 384 supports, among other things, load and store operations performed by the execution units.

Each SM 310 also has access to level two (L2) caches (not shown) that are shared among all GPCs 208 in PPU 202. The L2 caches may be used to transfer data between threads.

Finally, SMs 310 also have access to off-chip memory, which may include PP memory 204 (also known as "global" memory) and/or system memory 104. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Generating Image Tiles

In general, the SM 310 may be configured to execute a large number of threads in parallel to perform graphics, general processing and/or compute operations. Notably, the concurrency and dedicated memory resources provided by the SM 310 typically allow the SM 310 to optimize the execution of computationally-intensive operations. One computationally-intensive operation that is particularly well-suited for execution by the SM 310 is the multi-convolution operation. Typically, in conventional techniques that leverage parallel processing subsystems to perform multi-convolution operations, the SMs 310 execute optimized matrix multiplication routines included in libraries.

One limitation of such matrix-based approaches to performing multi-convolution operations is that the memory required to set up efficient matrix multiplication operations may strain the available PP memory 204. More specifically, the image matrix that is the input to the matrix multiplication is an expanded version—containing significant redundant data—of the image batch that is the input to the multi-convolution image. In operation, the SM 310 executes the matrix multiplication operations on sub-matrices, referred to herein as tiles, of the image batch. Accordingly, to exploit the optimized matrix multiplication routine without straining the PP memory 204, for each "image tile," the convolution subsystem 180 generates the image tile as-needed, processes the image tile, and then discards the image tile. Advantageously, only a portion of the image matrix is stored in the shared memory 382 at any given time. In alternate embodiments, the convolution subsystem 180 may operate on any type of input data, also referred to herein as "samples," instead of image data.

Figure 4:
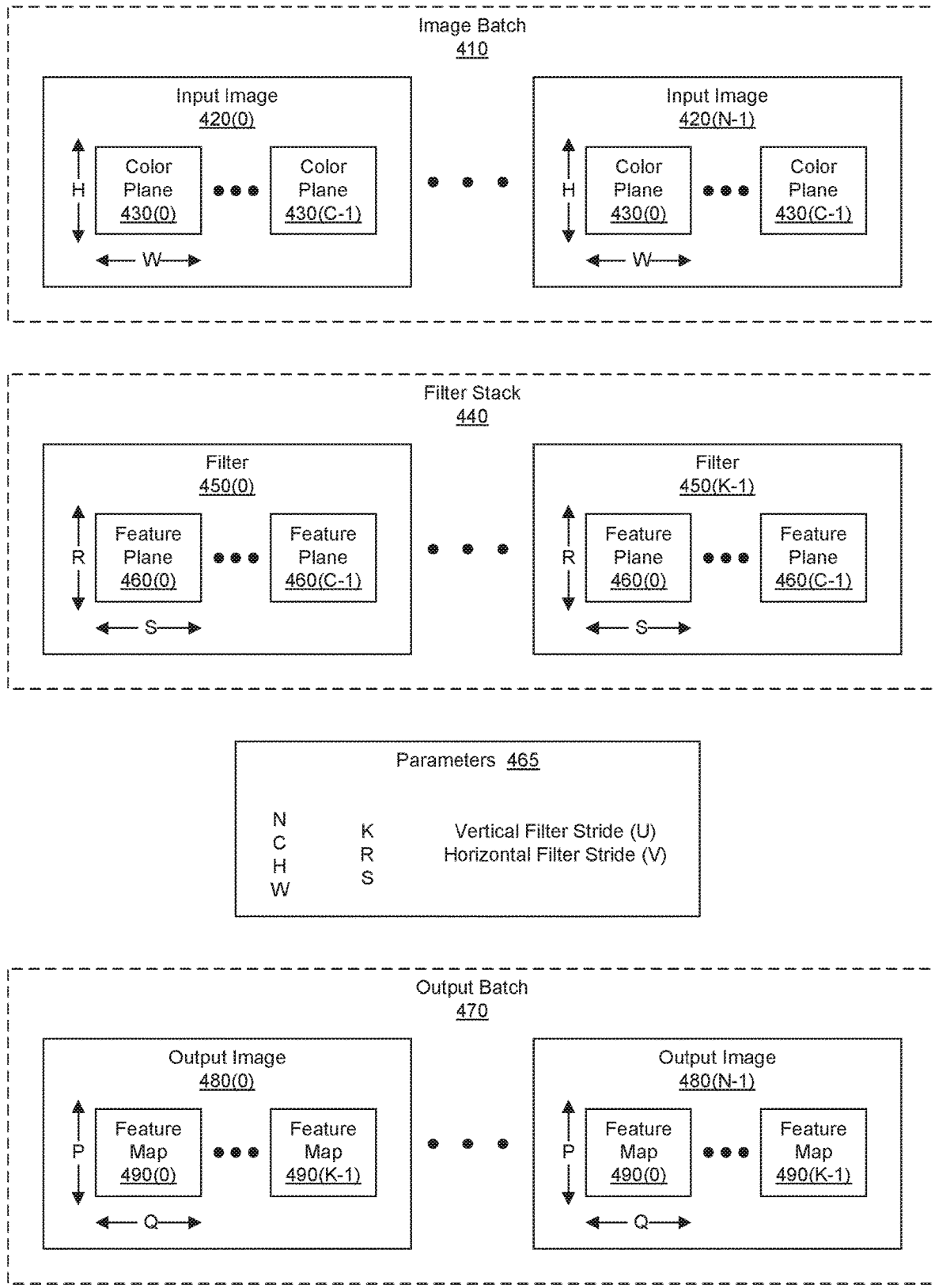
FIG. 4 illustrates an image batch, a filter stack, and an output batch associated with a multi-convolution operation, according to various embodiments of the present invention.

FIG. 4 illustrates an image batch 410, a filter stack 440, and an output batch 470 associated with a multi-convolution operation, according to various embodiments of the present invention. In the context of FIG. 4, the streaming multiprocessor (SM) 310 is configured to perform a multi-convolution operation between the image batch 410 and the filter stack 440 to produce the output batch 470. The multi-convolution operation corresponds to the predominant calculation involved in executing a particular convolution layer included in a CNN.

As shown, the image batch 410 includes, without limitation, any number of input images 420(0:N-1). For explanatory purposes, multiple instances of like objects are denoted with reference numbers identifying the object and parenthetical numbers identifying the instance where needed. Further, a range of "X" like objects are denoted with a parenthetical range (i.e., (0:X-1)). Each of the input images 420 includes, without limitation, any number of color planes 430(0:C-1). For example, each of the input images 420 may include three color planes 430: the color plane 430(0) "red", the color plane 430(1) "green," and the color plane 430(2) "blue." Each of the input images 420 is associated with an image height, shown as "H," and an image width, shown as "W." Notably, the image height and the image width define the dimensions of each of the color planes 430. Accordingly, the image batch 410 includes (N×C×H×W) unique values.

In a complementary fashion, the filter stack 440 includes, without limitation, any number of filters 450(0:K-1). In some embodiments, each of the filters 450 may represent a triggering search item associated with the layer of the CNN. For example, the CNN may be included in a face recognition algorithm, and the filter 450(0) may represent an ear. Each of the filters 450 includes, without limitation, features planes 460(0:C-1), where the number of the feature planes 460 is equal to the number of the color planes 430. Each of the filters 450 is associated with a filter height, shown as "R," and an filter width, shown as "S." The filter height and the filter width define the dimensions of each of the feature planes 460 and, therefore, the filter stack 440 includes (K×C×R×S) unique values.

As also shown, there are numerous parameters 465 associated with the multi-convolution operation. The dimensions of the image batch 410 and the filter stack 440 represent five independent parameters of the multi-convolution operation: N (the number of the input images 420 in the image batch 410), C (the number of the color planes 430 in each of the input images 420 and the number of the feature planes 460 in each of the filters 450), H (the image height), W (the image width), K (the number of the filters 450 in the filter stack 440), R (the filter height), and S (the filter width). The parameters 465 also include, without limitation, V (a horizontal filter stride), and U (a vertical filter stride). The horizontal filter stride and the vertical filter stride reduce the computational load by decreasing the size of the subset of pixels involved in the multi-convolution operation. Notably, the horizontal filter stride and the vertical filter stride not only reduce the time required to perform the multi-convolution operation, but also reduce the size of the output batch 470 produced by the multi-convolution operation.

In alternate embodiments, additional parameters 465 may correspond to additional dimensions, strides, optimization, formatting, and/or other configuration options. For example, in some embodiments, the parameters 465 may include a padding height and a padding width. The padding height and the padding width append, respectively, rows of zeros and columns of zeros to output images 480 included in the output batch 470 for any technical reason, such as formatting for future operations.

The output batch 470 includes, without limitation, the output images 480(0:N-1), where the number of the output images 480 equals the number of the input images 420. Each of the output images 480 includes, without limitation, feature maps 490(0:K-1), where the number of the feature maps 490 equals the number of the filters 450. Each of the output images 480 is associated with an output height, shown as "P," and an output width, shown as "Q." The output height and the output width define the dimensions of the features maps 490. Accordingly, the output batch 470 includes (N×K×P×Q) unique values.

As previously described herein, the convolution subsystem 180 leverages the optimized matrix multiplication capabilities of the SM 310 to efficiently perform the multi-convolution operation. As persons skilled in the art will recognize, the multi-convolution operation between the input batch 410 and the filter stack 440 may be converted to matrix multiplication operations between an image matrix and a filter matrix. The conversion operations are well-known in the art and result in deterministic relationships between the values included in the input batch 410 and the values included in the image matrix. In a complementary fashion, the conversion operations result in deterministic relationships between the values included in the filter stack 440 and the values included in the filter matrix. To optimize the use of the PP memory 204, the convolution subsystem 180 does not store the image matrix in the PP memory 204. Instead, the convolution subsystem 180 configures the SM 310 based on these deterministic relationships—expanding image tiles included in a "virtual" image matrix on the fly.

Figure 5:
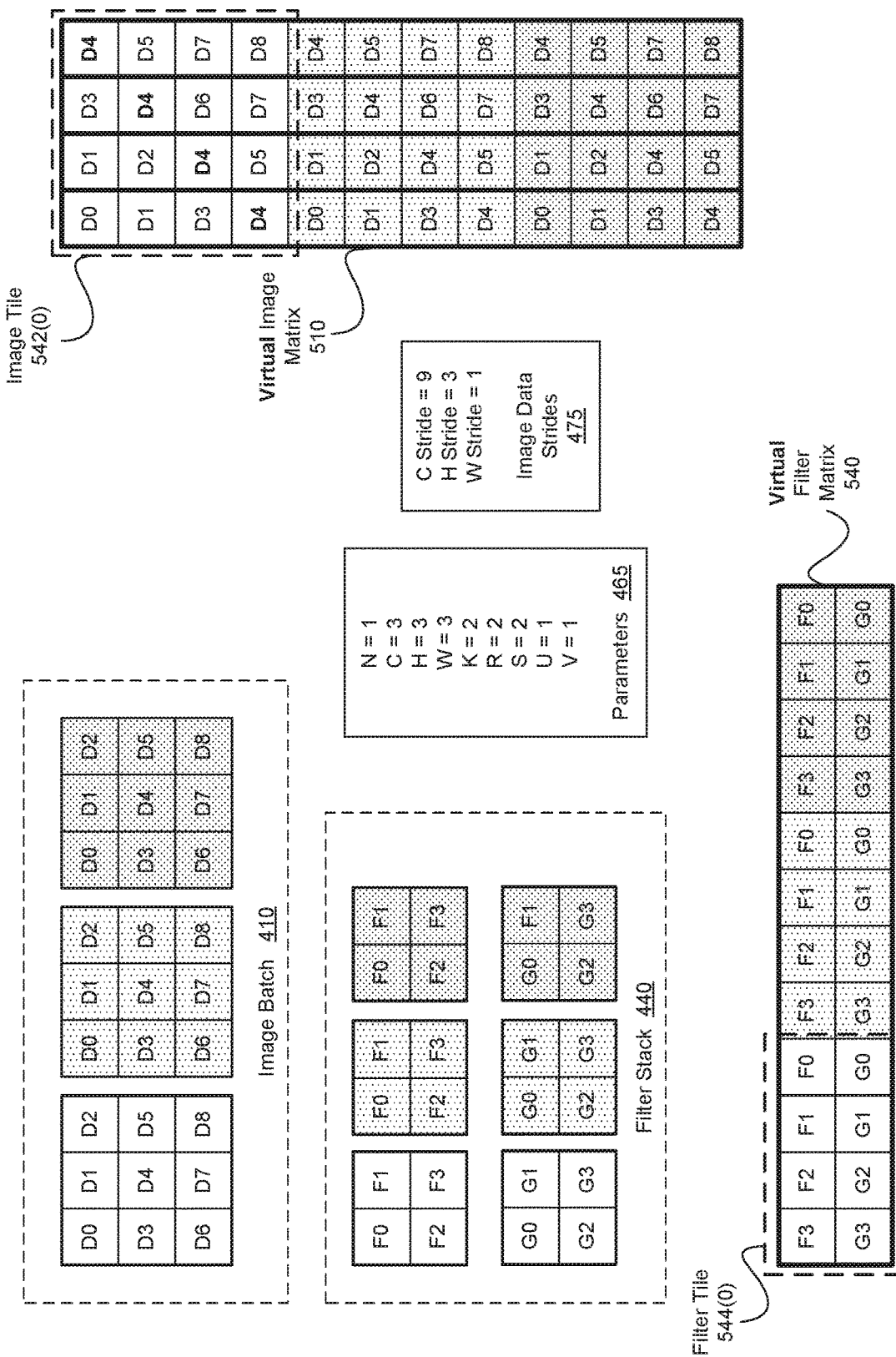
FIG. 5 illustrates the relationship between the image batch of FIG. 4 and a virtual image matrix, according to various embodiments of the present invention.

FIG. 5 illustrates the relationship between the image batch 410 of FIG. 4 and a virtual image matrix 510, according to various embodiments of the present invention. FIG. 5 also illustrates relationships between the filter stack 440 of FIG. 4 and a virtual filter matrix 540. For explanatory purposes, the parameters 465, and consequently the dimensions of the image batch 410, the virtual image matrix 510, the filter stack 440, and the virtual filter matrix 540, are: N=1, C=2, H=3, W=3, K=2, R=2, S=2, U=1, and V=1. Further, in accordance with the memory footprint of the image batch 410, image data strides 475 are: C stride=9, H stride=3, and W stride=1.

As part of the expansion of the image batch 410 into the virtual image matrix 510, each of four columns in the virtual image matrix 510 is associated with the values included in the image batch 410 that are required to compute one column of values in an output matrix (not shown). Such an expansion includes duplication of some of the values included in the image batch 410. For example, as depicted for the value "D4," the center of each of the three-by-three color planes 410 is used four times to compute each of four columns in the output matrix and, consequently, each of the center values (e.g., the "D4" values) is associated with four separate columns of the virtual image matrix 510. For explanatory purposes, values included in the image batch 410 are referred to as the data at "source" addresses. Similarly, values included in the virtual image matrix 510 are referred to herein as the data at corresponding "virtual" addresses. As a result, multiple virtual addresses in the virtual image matrix 510 are associated with a single source address included in the image batch 410. In a complementary manner, each of the rows of the virtual filter matrix 540 contains the values included in the filter stack 440 that are required to compute one or more of the tiles in an output matrix.

In general, if the dimensions of the input batch 410 are (N×C×H×W), the dimensions of the filter stack 440 are (K×C×R×S), and the dimensions of the output batch 470 are (N×K×P×Q), then the dimensions of the virtual image matrix 510 are (C×R×S)×(N×P×Q), the dimensions of the virtual filter matrix 540 are K×(C×R×S), and the dimensions of the output matrix are K×(N×P×Q). For the example shown, the dimensions of the input batch 410 are (1×3×3×3), the dimensions of the filter stack 440 are (2×3×2×2), and the dimensions of the output batch 470 are (1×2×2×2). Consequently, the dimensions of the virtual image matrix 510 are (12×4), the dimensions of the virtual filter matrix 540 are (2×12) and the dimensions of the output matrix are (2×4).

Notably, because the dimensions of the virtual image matrix 510 are products of the independent parameters associated with the multi-convolution operation, the matrix-based multi-convolution operation exhibits relatively uniform behavior across varying parameters. For example, although the parameters C, R, and S may individually vary dramatically across the multi-convolution operations associated with different layers of a particular CNN, the products of the parameters C, R, and S typically do not vary dramatically across the multi-convolution operations. Consequently, the optimized performance of the matrix-based multi-convolution operation is relatively consistent across changes in the values of individual parameters.

As the (C×R×S)×(N×P×Q) dimensions of the virtual image matrix 510 illustrate, simultaneously and redundantly storing the values associated with all the addresses included in the virtual image matrix 510 may strain the PP memory 204. Consequently, the convolution subsystem 180 configures the SM 310 to manifest and process the virtual image matrix 510 in a "lazy" manner. More specifically, the convolution subsystem 180 partitions the virtual image matrix 510 into separate image tiles 542, and then configures the SM 310 to process the image tiles 542. Further, the convolution subsystem 180 associates each of the "destination" addresses in each of the image tiles 542 with a virtual address included in the virtual image matrix 510. For example, as depicted in FIG. 5, the convolution engine 125 associates the sixteen destination addresses included in the image tile 542(0) with the sixteen virtual addresses included in the first four rows of the virtual image matrix 510.

Each of the virtual addresses in the virtual image matrix 510 is related deterministically to a source address included in the image batch 410. Consequently, each of the destination addresses in the image tiles 542 is related deterministically to a source address included in the image batch 410. Accordingly, the convolution subsystem 180 may perform addressing computations that enable the convolution subsystem 180 to copy the proper data from the image batch 410 directly to each destination address included in each of the image tiles 542 without creating the virtual input matrix 510.

To avoid introducing integer latencies associated with performing addressing computations while generating the image tiles 542, the convolution preprocessor 182 is configured to leverage a consistent pattern of source addresses that is inherent in the virtual image matrix 510. More specifically, while each of the columns of the virtual image matrix 510 are associated with a different sequence of source addresses that follow a serpentine path through the image batch 410, the sequences are affine (in a multi-dimensional sense).

For example, the first column of the virtual image matrix 510 is associated with the first source address sequence D0, D1, D3, and D4 for each of three color planes 430. Adding 1 to each element in this first sequence yields D1, D2, D4, and D5 for each of the three colors planes 430—corresponding to the source address sequence that is associated with the second column of the virtual image matrix 510. Similarly, adding 3 to each element in the first sequence yields the source address sequence that is associated with the third column of the virtual image matrix 510, and so forth. An example of how the convolution preprocessor 182 leverages this consistent pattern is described in greater detail in FIG. 6.

As part of processing each of the image tiles 542, the SM 310 loads data from the image batch 410 to form the image tile 542, and loads data from the filter stack 440 to form the corresponding filter tile 544. The SM 310 then performs matrix multiplication operations between the image tile 542 and the filter tile 544, stores the result as an output tile in the PP memory 204, and then discards the data included in the image tile 542 and the filter tile 544. Consequently, at any given point in time, the shared memory 382 includes the image tiles 542 that the SM 310 is currently processing, but does not necessarily include the image tiles 542 that the SM 310 has already processed or has not begun processing.

The convolution subsystem 180 may set the size of the image tile 542 in any technically feasible fashion that optimizes the capabilities of the SM 310. For example, the convolution subsystem 180 may set the size of the image tile 542 based on any number and combination of the size of the shared memory 382, the number of threads in each thread group, and so forth. In alternate embodiments, the convolution subsystem 180 may receive the size of the image tile 542 as an auxiliary input to the multi-convolution operation. The convolution subsystem 180 sets the size of the filter tile 544 based on the size of the image tile 542. More specifically, the convolution subsystem 180 sets the size of the filter tile 545 such that the matrix multiplication between each the image tiles 542 and the corresponding filter tile 544 produces the data to properly populate an output tile.

In alternate embodiments, the convolution subsystem 180 may configure the SM 310 based on any technically feasible implementation of the virtual image matrix 510 and the virtual filter matrix 540 that facilitate performing the multi-convolution operation via matrix multiplication operations. Further, the convolution subsystem 180 may partition the data included in the virtual image matrix 510 and the virtual filter matrix 540 into image tiles 542 and filter tiles 544 in any technically feasible, consistent fashion.

Generating the Offset Sequence

Figure 6:
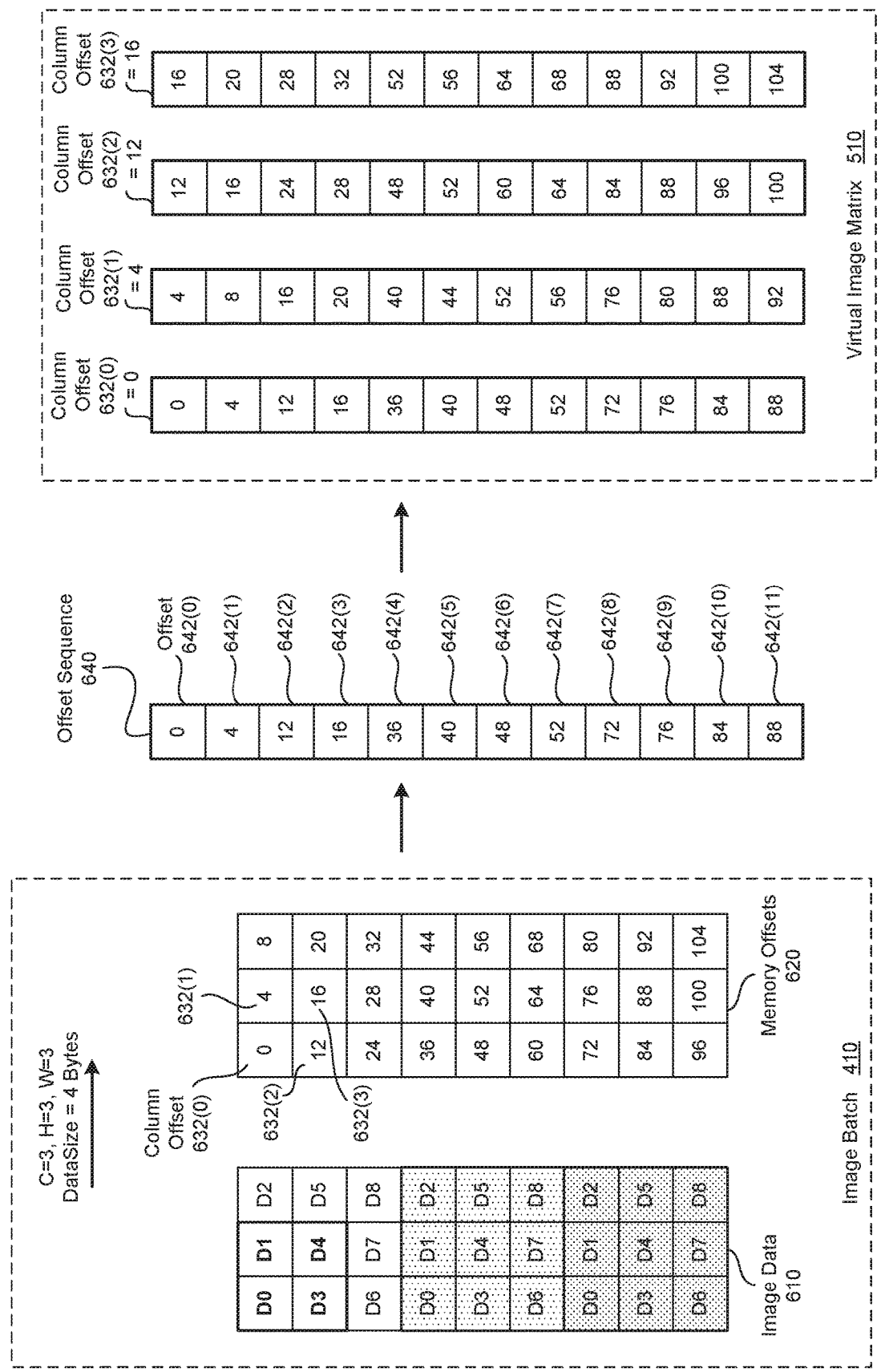
FIG. 6 illustrates the relationships between the image batch of FIG. 4, an offset sequence, and the virtual image matrix of FIG. 5, according to various embodiments of the present invention.

FIG. 6 illustrates the relationships between the image batch 410 of FIG. 4, an offset sequence 640, and the virtual image matrix 510 of FIG. 5, according to various embodiments of the present invention. For explanatory purposes, the image batch 410 is depicted as image data 610 and as memory offsets 620. As shown, the memory offset 620 for a particular value of image data 610 is a based on the color plane 430, the vertical location within the image, the horizontal location within the image, and the data size associated with the value of the image data 610. For example, the memory offset 620 for D4 is (1*2*2)*4 bytes=16.

As outlined in conjunction with FIG. 5, while the serpentine pattern of each column is offset from the serpentine pattern of the other columns, the serpentine pattern represents a uniform sequence of offsets for every row of the virtual image matrix 510. For example, for each column of the virtual image matrix 510, the source address associated with the second row is four greater than the source address associated with the first row. In operation, the convolution preprocessor 182 generates the offset sequence 640 based on this serpentine pattern. The offset sequence 640 includes an offset 642 for each row of the virtual image matrix 510. The convolution preprocessor 182 may generate the offset sequence 640 in any technically feasible fashion that captures any pattern inherent in the virtual image matrix 510.

Further, the serpentine pattern of each column is offset from the serpentine pattern of the other columns. For example, the first column of the virtual image matrix 510 is associated with the source address sequence 0, 4, 12, 16, 26, 40, 48, 52, 72, 76, 84, and 88. Adding 4 to each source address included in this sequence yields the source address sequence 4, 8, 16, 20, 40, 44, 52, 56, 76, 80, 88, and 92 that is associated with the second column of the virtual image matrix 510. As persons skilled in the art will recognize, a column offset 632 that specifies a difference between the first column of the virtual image matrix 510 and a particular column of the virtual image matrix 510 equals the source address associated with the first row of the particular column.

Figure 7:
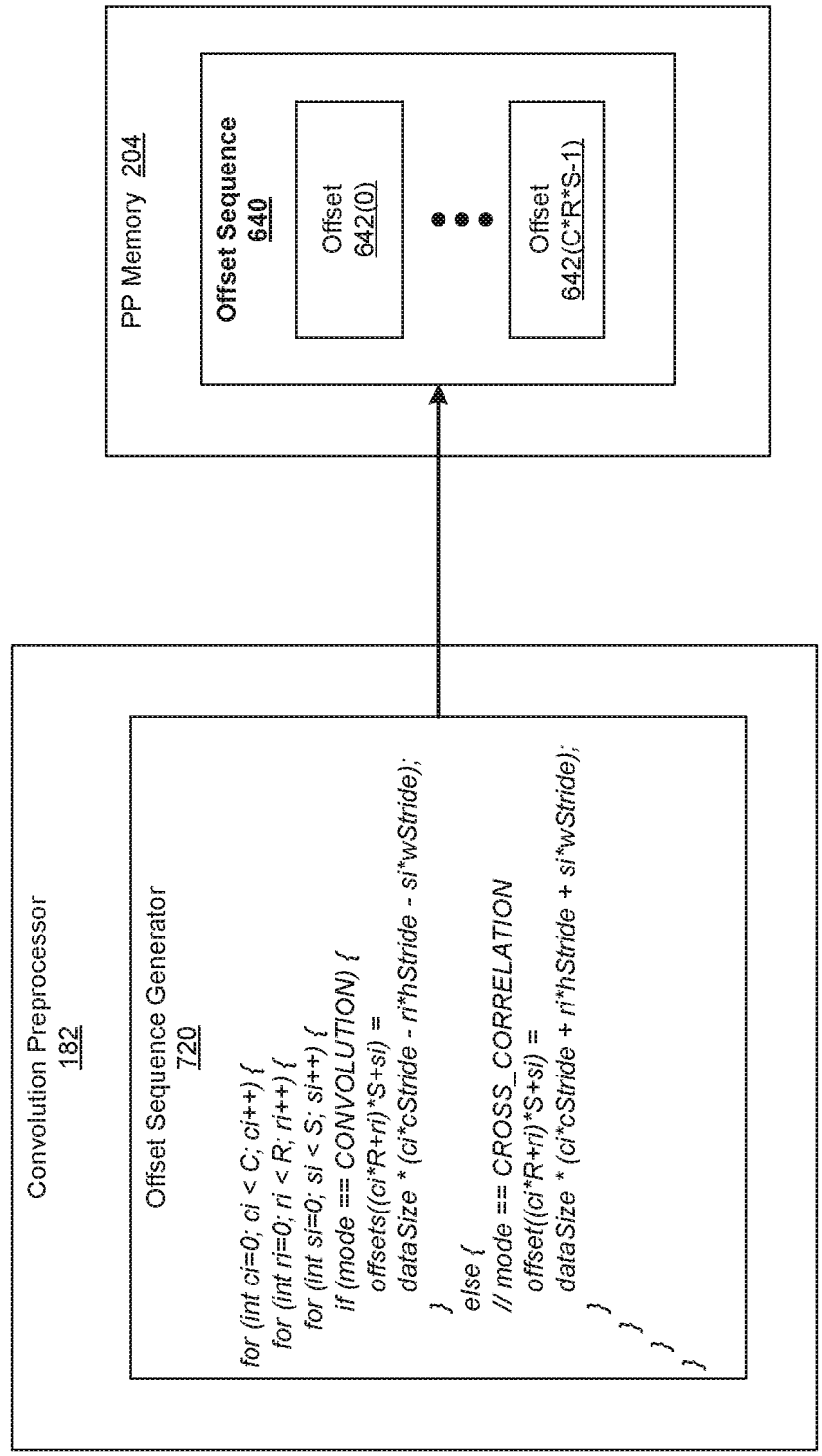
FIG. 7 illustrates the convolution preprocessor of FIG. 1 configured to generate the offset sequence of FIG. 6, according to various embodiments of the present invention.

FIG. 7 illustrates the convolution preprocessor 182 of FIG. 1 configured to generate the offset sequence 640 of FIG. 6, according to various embodiments of the present invention. As shown, FIG. 7 depicts an offset sequence generator 720 as pseudocode that the convolution preprocessor 182 may implement. The offset sequence generator 720 creates the offset sequence 640 to offload time consuming address computations from the convolution engine 184. Such offloading enables the SM 310 to efficiently execute an optimized matrix multiplication routine to perform the convolution operations.

In general, the offset sequence generator 720 may execute on any type and number of processing units and store the offset sequence 640 in any accessible memory. For example, in some embodiments, the offset sequence generator 720 may execute on the CPU 102 and store the offset sequence 640 in the system memory 104. Subsequently, the device driver 175 may copy the offset sequence 640 to the PP memory 204. When the convolution engine 184 accesses the offset sequence 640, the offset sequence 640 may be loaded through the L1 cache 384. In other embodiments, the offset sequence generator 720 may execute on the parallel processing subsystem 112. In such embodiments, the offset sequence generator 720 may store the offset sequence 640 directly in the PP memory 204.

As shown, the offset sequence generator 720 generates (C*R*S) offsets 642 based on the color plane (c) 430, the filter height (r), the filter width (s), the image height stride (h stride), and the image width stride (w stride). In alternate embodiments, the pseudocode depicted in FIG. 7 may be modified to represent any number of dimensions. Further, as shown in the pseudocode, the offset sequence generator 720 may be configured to generate an offset sequence 640 that represents a cross-correlation operation instead of a convolution operation.

As outlined above, the offset sequence 640 specifies a mapping from source addresses in the image batch 410 to virtual addresses in the virtual image matrix 510. Since the convolution engine 125 associates each of the destination addresses in each of the image tiles 542 with virtual addresses in the virtual image matrix 510, the convolution engine 125 may leverage the offset sequence 640 to properly populate the image tiles 542. In general, the convolution preprocessor 182 and the convolution engine 125 may be configured to exploit any pattern inherent in the virtual image matrix 510 based on any number of offsets 642 and any number of offset sequences 640.

Performing Matrix-Based Multi-Convolution Operations

Figure 8:
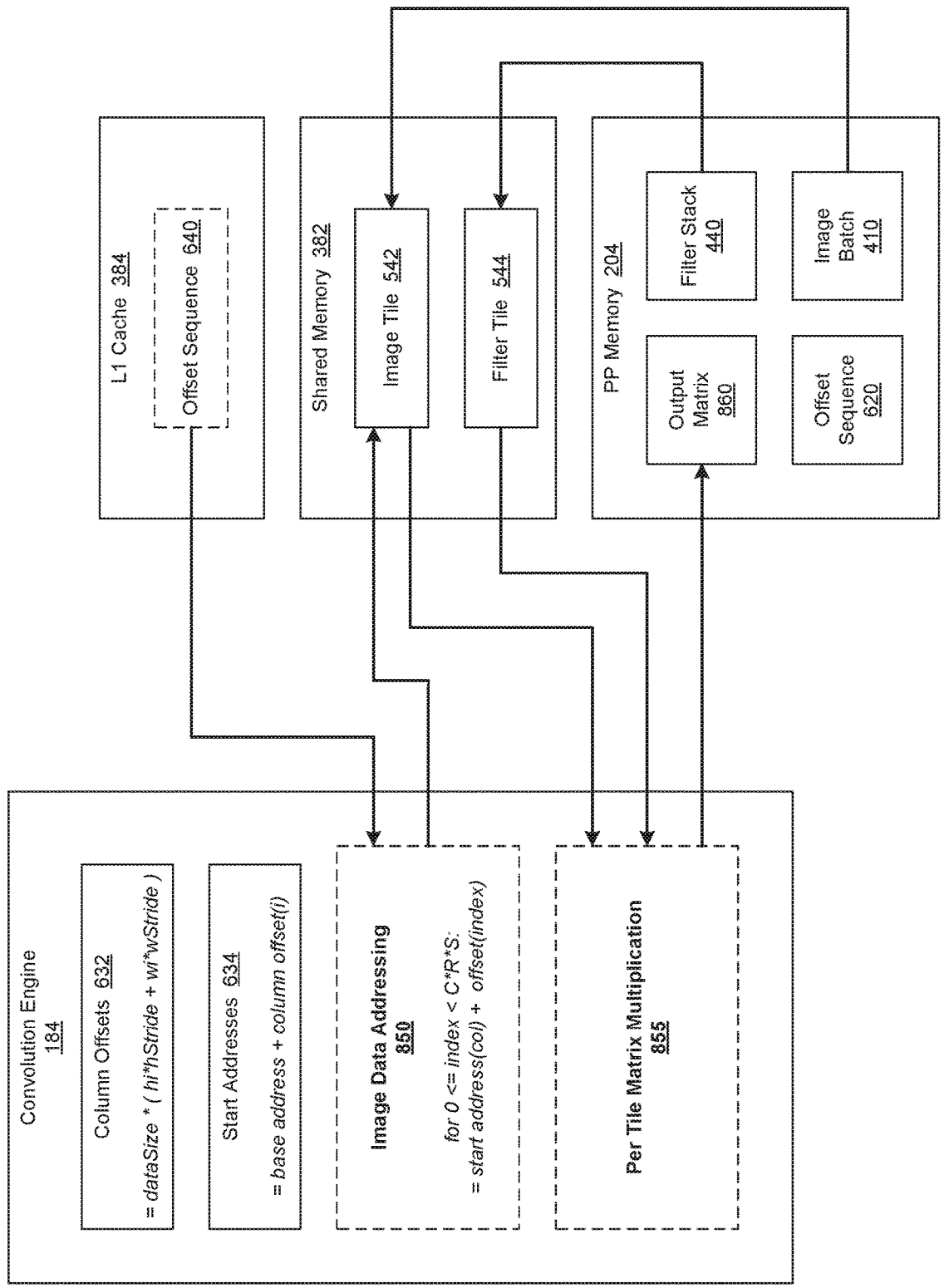
FIG. 8 illustrates the convolution engine of FIG. 1 configured to perform a multi-convolution operation, according to various embodiments of the present invention.

FIG. 8 illustrates the convolution engine 184 of FIG. 1 configured to perform a multi-convolution operation, according to various embodiments of the present invention. In the context of FIG. 8, the convolution engine 184 configures functional units (e.g., execution units, load-store units, etc.) included in the streaming multiprocessor (SM) 310 to perform operations that implement multi-convolution operations. For explanatory purposes, operations performed by the SM 310, including the functional execution units, that are configured by the convolution engine 184 are also referred to herein as operations performed by the convolution engine 184.

In operation, to exploit the parallel processing capabilities of the SM 310, the convolution engine 184 assigns the processing of each of the image tiles 542 to a thread group or a thread array. As persons skilled in the art will recognize, the convolution engine 184 may assign any number of image tiles 542 to a single thread group and/or may assign any number of operations or destination addresses in the image tiles 542 to a single thread. If a thread group is assigned to process multiple image tiles 542, then the thread group may sequentially process the assigned image tiles 542 or may distribute the processing in any technically feasible fashion between the threads included in the thread group. If a thread is assigned to process multiple destination addresses in the image tile 542, then the thread may sequentially process the assigned destination addresses.

Advantageously, the convolution engine 184 may configure the SM 310 to pipeline the processing of the image tiles 542 to minimize the latency associated with accessing the input data included in the PP memory 204. More specifically, the convolution engine 184 may configure the SM 310 to copy data included in the image batch 410 and the filter stack 440 to, respectively, the image tile 542(0) and the filter tile 544(0). The convolution engine 184 may configure the SM 310 to then perform matrix multiplication operations between the image tile 542(0) and the filter tile 544(0) and, substantially in parallel, copy data included in the image batch 410 and the filter stack 440 to, respectively, the image tile 542(1) and the filter tile 544(1). In alternate embodiments, the convolution engine 184 may orchestrate any type of pipelining in any technically feasible fashion. For example, and without limitation, the convolution engine 184 may strategically assign the processing the image tiles 542 to thread groups to facilitate a two stage (loading data and performing matrix multiplication operations) pipeline.

As shown, the convolution engine 184 includes, without limitation, column offsets 632 and start addresses 634. The PP memory 204 includes, without limitation, the filter stack 440, the image batch 410, the offset sequence 640, and an output matrix 860. As depicted using a dotted box, the convolution engine 184 typically accesses the offset sequence 640 through the L1 cache 384. The shared memory 382 includes, without limitation, the image tile 542 and the filter tile 544. For each thread group, the convolution engine 184 determines the source addresses in the image batch 410 corresponding to the destination addresses in the image tile 542 that is assigned to the thread group.

More specifically, for each image tile 542, the threads in the assigned thread group collaboratively compute the column offsets 632 associated with the columns included in the image tile 542. For example, for a four-by-four image tile 542, the threads would calculate four column offsets 632 corresponding to four columns. More specifically, for each of the relevant columns, the assigned thread group sets the column offset 632 to the difference between the source address associated with the first row of the relevant column and the source address associated with the first row of the first column.

Subsequently, for each of the column offsets 632, the assigned thread group sums the base address of the image batch 410 and the column offset 632 to generate the start address 634. As persons skilled in the art will recognize, the start addresses 634 equal the source addresses in the image batch 410 that map to the first row of the virtual image matrix 510. After computing the start addresses 634 for the image tile 542, the threads in the assigned thread group perform image data addressing 850 to generate the image tile 542.

First, the thread group accesses the portion of the offset sequence 640 associated with the rows of the virtual image matrix 510 that correspond to the image tile 542. As previously described, each destination address included in the image tile 542 is associated with a virtual address included in the virtual image matrix 510. Accordingly, the thread group populates the image tile 542 based on the mapping between the source address included in the image batch 410 and the virtual address included in the virtual image matrix 510. In particular, the thread group computes the source address that corresponds to a column of the virtual image matrix 510 and a row of the virtual image matrix 510 as the sum of the start address 634 associated with the column and the offset 642 associated with the row. After computing each source address, the thread group copies the image data 610 stored at the source address (included in the image batch 410) to the corresponding destination address included in the image tile 542.

Because the convolution engine 184 generates the image tiles 542 as-needed, the convolution engine 184 stores only a portion of the virtual image matrix 510 in the shared memory 382 at any given time. The time required for the threads to execute the image data addressing 850 is significantly shorter than the time required to perform the numerous, dependent integer addressing operations implemented in some conventional tile-based convolution engines.

The thread group also generates the filter tile 544 associated with the image tile 542. The thread group may copy data from the filter stack 440 included in the PP memory 204 to the filter tile 544 included in the shared memory 382 in any technically feasible fashion that is consistent with the data included in the image tile 542. For example, the thread group may implement a linear mapping between the filter stack 440 and the filter tile 544 based on the source addresses associated with the image tile 542.

After each thread group has finished generating the assigned image tile 542 and the corresponding filter tile 544, the thread group executes within a floating-point unit included in the SM 310, implementing the functionality of "per tile matrix multiplication" 855. More specifically, each of the thread groups configures the floating-point unit to perform matrix multiplication operations between the assigned image tile 542 and the corresponding filter tile 544. The thread group further configures the floating-point unit to update the output matrix 860 based on the results of the matrix multiplication.

After the thread groups have finished generating an output tile included in the output matrix 860, the thread groups transpose the output matrix 860 into the output batch 470 (not shown in FIG. 8), also included in the PP memory 204. The thread groups may implement any number formatting operations that generate the output batch 470 based on any organization or any subset or superset of the data included in the output matrix 860. Typically, the output batch 470 implements a format that is consistent with the format of the image batch 410, thereby enabling the output batch 470 to be used as the input batch 410 for the multi-convolution operation that implements the next convolution layer included in the CNN.

In general, components included in the computer system 100 may store any of the image batch 410, the filter stack 440, the offset sequence 640, and/or the output matrix 860 in any type of memory structure included in the PP memory 204. For example, any number, including zero, of the image batch 410, the filter stack 440, the offset sequence 640, and/or the output matrix 860 may be included in a frame buffer. In other embodiments, components included in the computer system 100 may store the image batch 410, the filter stack 440, the offset sequence 640, and/or the output matrix 860 in any type of memory instead of the PP memory 204. Similarly, in alternate embodiments, the convolution engine 125 may store the image tiles 542 and the filter tiles 544 in any type of memory instead of the shared memory 382.

In alternate embodiments, the convolution subsystem 180 may configure the offset sequence 640 to include any number of offsets 642 based on any number of parameters 465 and any number of image data strides 475 in any combination. For example, the number of dimensions associated with the image batch 410, the number of dimensions associated with the filter stack 440, the image data strides 475, and the number of rows included in the virtual image matrix 510 could differ across various embodiments. Further, in some embodiments, the offset sequence 640 may include only a subset of dimensions. For example, the convolution preprocessor 182 could compute the offsets 642 for each of (R*S) rows of the virtual image matrix 510 based on the image height stride and image width stride. In a complementary fashion, the convolution engine 184 could be configured to apply the offsets 642 repeatedly—once for each of the C color planes 430—across each of columns of the virtual image matrix 510 to determine the source addresses associated with each of the (C*R*S) rows of the virtual image matrix 510.

Figure 9:
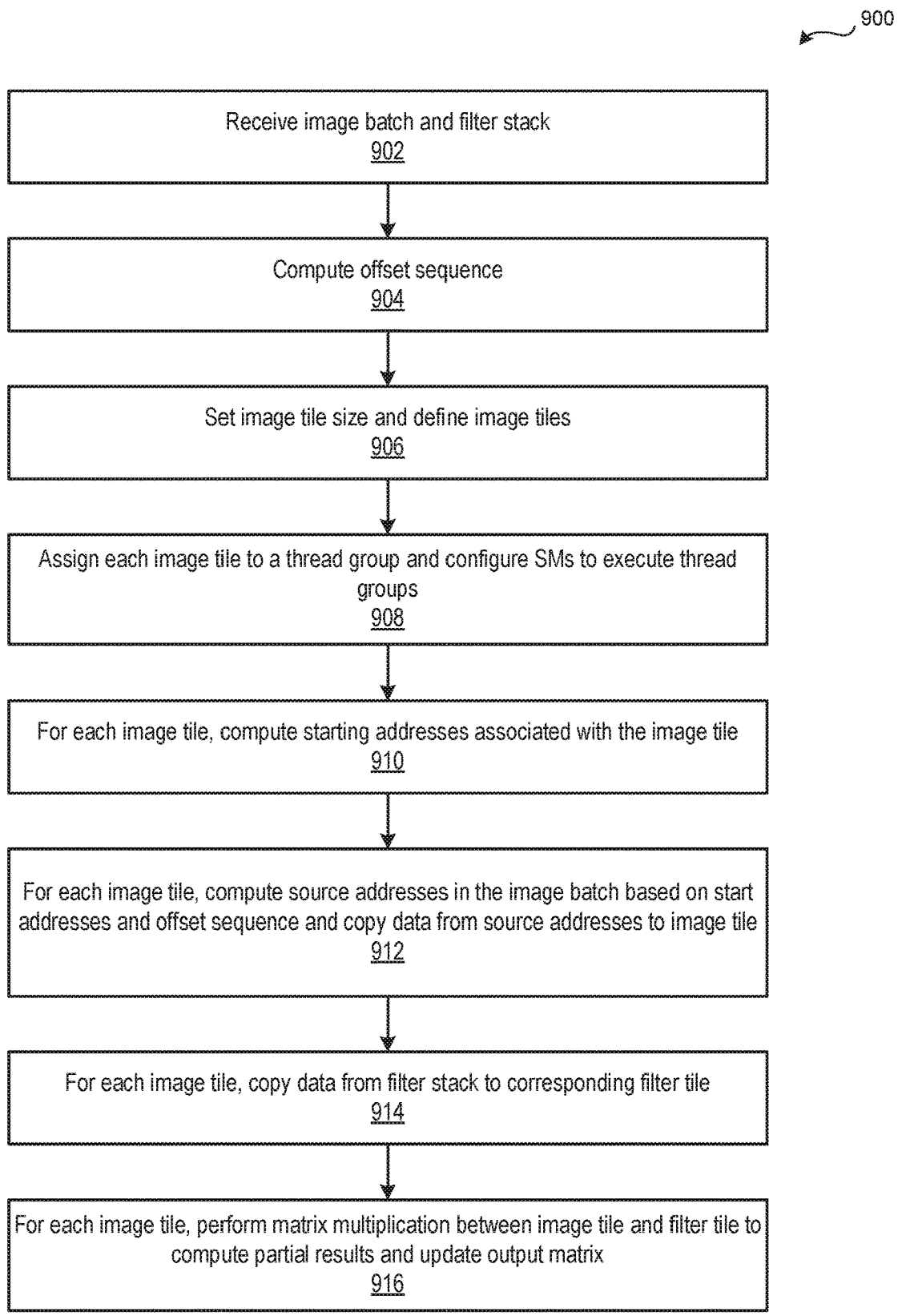
FIG. 9 is a flow diagram of method steps for performing a multi-convolution operation in a parallel processing system, according to various embodiments of the present invention.

FIG. 9 is a flow diagram of method steps for performing a multi-convolution operation in a parallel processing system, according to various embodiments of the present invention. Although the method steps are described in conjunction with the systems of FIGS. 1-8, persons skilled in the art will understand that any system configured to implement the method steps, in any order, falls within the scope of the present invention.

As shown, a method 900 begins at step 902, where the convolution subsystem 180 receives the image batch 410 and the filter stack 440. At step 904, the convolution preprocessor 182 computes the offset sequence 640 associated with the virtual image matrix 510 and then stores the offset sequence 640 in the PP memory 204. The convolution preprocessor 182 may compute the offset sequence 640 in any technically feasible fashion that is representative of a pattern that maps a subset of source addresses in the image batch 410 to the corresponding virtual addresses along the image matrix columns 544 of the virtual image matrix 510 based on the row. For example, suppose that the dimensions of the dimensions of the input batch 410 are (N×C×H×W) and the dimensions of the filter stack 440 are (K×C×R×S). In such an example, the convolution preprocessor 182 could compute the offsets 642 for each of the (C*R*S) rows of the virtual image matrix 510 based on C stride, H stride, and W stride.

The convolution preprocessor 182 may execute on any processing unit (e.g., CPU 102, SM 310, etc.) and store the offset sequence 640 in the PP memory 204 in any technically feasible fashion. For example, in some embodiments, the convolution preprocessor 182 may execute on the CPU 102 and store the offset sequence 640 in the system memory 104. Subsequently, the device driver 175 may copy the offset sequence 640 from the system memory 104 to the PP memory 204. When the SM 310 initially accesses the offset sequence 640, the SM 310 may load the offset sequence 640 into the L1 cache 384.

At step 906, the convolution subsystem 180 determines the size of the image tile 542 and then defines the image tiles 542—associating destination addresses in each of the image tiles 542 with virtual addresses in the virtual image matrix 510. At step 908, the convolution engine 184 assigns the processing of each of the image tiles 542 to a thread group. The convolution engine 184 then configures the SM 310 to execute the thread groups.

At step 910, for each of the image tiles 542, the assigned thread group computes the start addresses 634 associated with the columns included in the image tile 542. More specifically, for each of the columns, the assigned thread group sets the start address 634 to the source address included in the image batch 410 that is associated with the column of the virtual image matrix 510 and the first row of the virtual image matrix 510. At step 912, for each of the image tiles 542, the thread group computes source addresses in the image batch 410 and copies the data stored at the source addresses to corresponding destination addresses in the assigned image tile 542 that is stored in the shared memory 382. Notably, the threads in the assigned thread group compute the source address that corresponds to a particular column of the virtual image matrix 510 and a particular row of the virtual image matrix 510 as the sum of the start address 634 associated with the column and the offset 642 associated with the row.

At step 916, for each of the image tiles 542, the thread group performs matrix multiplication operations between the image tile 514 and the corresponding filter tile 544. After all the threads groups have finished processing all the assigned image tiles 514, the output matrix 860 is complete, and threads configured by the convolution subsystem 180 copy the data included in the output matrix 860 to the output batch 470 included in the PP memory 204.

In sum, the disclosed techniques enable a convolution subsystem to efficiently perform multi-convolution operations in a parallel processing system. In general, the convolution subsystem implements a virtual image matrix conforming to a column major format that enables a matrix-based convolution operation. The convolution subsystem includes a convolution preprocessor that executes on the CPU and/or a streaming multiprocessor (SM) included in the parallel processing subsystem, and a convolution engine that executes on an SM included in the parallel processing subsystem.

In operation, an offset sequence generator included in the convolution preprocessor precomputes an offset sequence that reflects a serpentine pattern of source memory addresses associated with a column of the virtual image matrix. Notably, the pattern is consistent across columns relative to the first source memory address associated with each column. A driver then executes copy operations that store the offset sequence in the parallel processing memory. The convolution engine divides the virtual image matrix into separate image tiles and then assigns the processing of each image tile to a different thread group.

For each thread group, the threads included in each thread group collaboratively calculate start addresses, where each start address corresponds to the first source address associated with a column that is represented in the assigned image tile. Subsequently, to populate the image tile, the threads indirectly access the appropriate image data included in the image batch stored in parallel processing memory based on the start addresses and the offset sequence. The threads then perform matrix multiplication operations between the image tile and a corresponding filter tile to generate partial results for the output matrix. Notably, as each thread processes assigned image tiles, the thread steps through the offset sequence. After the thread groups have finished processing all the image tiles, the convolution engine configures the threads to copy the data included in the output matrix to an output batch.

At least one advantage of the disclosed approach is that the convolution subsystem fully exploits the benefits inherent in parallel processing systems to achieve the high accuracy provided by CNNs while optimizing execution speed and the amount of parallel processing memory used. More specifically, by configuring the CPU to precompute the offset sequence, the convolution engine decouples computationally-intensive addressing operations associated with populating the tiles of the virtual image matrix from the performance-critical matrix multiplication operations. Further, at any given only a portion of the virtual image matrix resides in shared memory and the entire image matrix is not stored in parallel processing memory. Consequently, the parallel processing pipeline realizes the benefits of an optimized matrix multiplication while minimizing the amount of parallel processing memory used.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A method, comprising:
   computing one or more memory offsets corresponding to one or more locations in a matrix operand, the memory offsets computed based, at least in part, on one or more dimensions of the matrix operand;
   copying the computed offsets to memory of a parallel processor; and
   causing one or more software threads performed by the parallel processor to each use at least one of the one or more memory offsets stored in the memory of the parallel processor to access data corresponding to one or more locations of the matrix operand to perform a matrix multiplication.

2. The method of claim 1, further comprising copying image data to an image tile, and performing one or more matrix multiplication operations based, at least in part, on the image tile.

3. The method of claim 2, wherein the one or more matrix multiplication operations are performed to obtain a result of a convolution operation.

4. The method of claim 2, wherein the image tile includes at least two destination addresses that correspond to one or more physical addresses stored in the one or more locations in the memory of the parallel processor.

5. The method of claim 2, wherein copying the image data is based, at least in part, on a virtual image matrix.

6. The method of claim 1, further comprising populating an image tile based, at least in part, on one or more physical addresses and one or more virtual addresses included in a virtual image matrix, and performing one or more matrix multiplication operations using the image tile as a matrix operand.

7. The method of claim 1, wherein the memory of the parallel processor is to store a tile comprising image data and the computed offsets.

8. The method of claim 1, further comprising dividing a virtual image matrix into one or more image tiles, and processing each image tile included in the one or more image tiles using a different thread group, wherein processing each image tile includes accessing image data stored in the one or more locations in the memory of the parallel processor.

9. The method of claim 1, further comprising precomputing the one or more offsets and storing the one or more memory offsets in memory accessible to one or more parallel processing subsystems.

10. The method of claim 1, further comprising performing one or more convolutions by performing the one or more matrix multiplication operations, and wherein the memory offsets indicate a storage address of one or more portions of one or more operands to the one or more convolutions.

11. A non-transitory computer readable storage medium storing instructions, which if performed by one or more processors, cause the one or more processors to at least:
   compute one or more memory offsets corresponding to one or more locations in a matrix operand, the memory offsets computed based, at least in part, on one or more dimensions of the matrix operand; and
   cause one or more software threads to each use at least one of the one or more memory offsets to access data corresponding to one or more locations of the matrix operand and perform a matrix multiplication operation using the matrix operand.

12. The non-transitory computer readable storage medium of claim 11, wherein the instructions, which if performed by the one or more processors, further cause the one or more processors to at least perform one or more matrix multiplication operations that include retrieving input data stored in one or more locations of the memory of a parallel processor indicated by the one or more memory offsets.

13. The non-transitory computer readable storage medium of claim 12, wherein the instructions, which if performed by the one or more processors, further cause the one or more processors to copy data stored at one or more storage addresses indicated by the one or more memory offsets to a set of destination addresses.

14. The non-transitory computer readable storage medium of claim 11, wherein the instructions, which if performed by the one or more processors, further cause the one or more processors to at least partition a virtual image matrix into a set of image tiles and copy data stored at the one or more locations in the matrix operand to one or more image tiles in the set of image tiles, wherein one or more dimensions of the virtual image matrix is determined based, at least in part, on a number of parameters associated with a first matrix multiplication operation included in one or more matrix multiplication operations to be performed by the one or more processors.

15. The non-transitory computer readable storage medium of claim 11, wherein the instructions, which if performed by the one or more processors, further cause the one or more processors to at least perform one or more matrix multiplication operations and select a set of virtual addresses included in a virtual image matrix, wherein each virtual address included in the set of virtual addresses is mapped to a physical address associated with input data, the one or more matrix multiplication operations include a first convolution operation, and performing the one or more matrix multiplication operations comprises:
   loading, into a first memory, a portion of the input data associated with the first convolution operation using a subset of the set of virtual addresses, performing the first convolution operation on the portion of the input data, and removing the portion of the data from the first memory.

16. The non-transitory computer readable storage medium of claim 15, wherein the first memory comprises a shared memory, and the one or more physical addresses are included in a second memory.

17. The non-transitory computer readable storage medium of claim 11, wherein the instructions, which if performed by the one or more processors, further cause the one or more processors to at least perform one or more neural network operations that include:
   dividing a virtual image matrix into one or more image tiles;
   copying input data into the one or more image tiles; and
   processing each image tile included in the one or more image tiles using a different thread group.

18. The non-transitory computer readable storage medium of claim 11, wherein the matrix multiplication is performed using one or more parallel processing units.

19. The non-transitory computer readable storage medium of claim 11, wherein the one or more memory offsets indicate a storage address of one or more matrix operands to one or more convolutions to be performed by the one or more matrix multiplication operations.

20. One or more processors, comprising:
   circuitry to:
   compute one or more memory offsets corresponding to one or more locations in a matrix operand, the memory offsets computed based, at least in part, on one or more dimensions of the matrix operand; and
   cause one or more software threads to each use at least one of the one or more memory offsets to access data corresponding to one or more locations of the matrix operand and perform a matrix multiplication operation using the matrix operand.

21. The processor of claim 20, wherein the one or more circuits are to perform one or more matrix multiplication operations using one or more thread groups executing on the one or more circuits and data accessed using the one or more memory offsets.

22. The processor of claim 21, wherein a first thread group is configured to load at least a subset of data representing one or more input images using one or more of the one or more memory offsets, and a second thread group is configured to perform at least one matrix multiplication operation of the one or more matrix multiplication operations on the at least the subset of the data.

23. The processor of claim 20, wherein the one or more circuits are to perform one or more matrix multiplication operations on data representing one or more input images, wherein the data is accessed from memory using the one or more memory offsets.

24. The processor of claim 20, wherein the one or more circuits are to perform one or more matrix multiplication operations on data representing one or more input images, wherein the data is accessed from memory using one or more storage addresses computed using the one or more memory offsets and the one or more matrix multiplication operations include one or more convolution operations based, at least in part, on the data and one or more filter tiles.

25. The processor of claim 20, wherein the one or more offsets include one or more memory offset values relative to one or more start addresses of image data to be used as input by the one or more one or more dimensions of one or more matrix operands.

26. The processor of claim 20, wherein the one or more offsets include one or more column offset values and one or more memory offset values, and the one or more circuits are to generate one or more start addresses based, at least in part, on a base address of image data to be used as input by one or more neural networks and one or more of the one or more column offset values, and the one or more circuits are to generate one or more memory addresses based, at least in part, on the one or more start addresses and one or more of the one or more memory offset values.

27. The processor of claim 20, wherein the one or more circuits are to copy image data stored at one or more locations in the matrix operand to an image tile, and perform a matrix multiplication operation using the image tile.

28. The processor of claim 20, wherein the memory offsets include one or more memory offset values included in an offset sequence based, at least in part, on one or more filter parameters and one or more image parameters.

29. The processor of claim 20, wherein one or more storage addresses are to be obtained by:
   generating one or more data memory offset values relative to at least one start address without the at least one start address;
   generating the at least one start address based, at least in part, on at least one memory address for at least one matrix multiplication operation operand and one or more column offset values; and
   obtaining the one or more storage addresses based, at least in part, on the at least one start address and the one or more memory offset values.

30. The processor of claim 20, wherein the one or more offsets correspond to one or more respective elements of a matrix and wherein the one or more circuits are to use the dimensions of one or more neural networks to generate one or more storage addresses by at least using a start address of the matrix and the memory offsets to calculate the one or more storage addresses.

31. The processor of claim 30, wherein the one or more circuits are to further perform one or more convolution operations using the generated one or more storage addresses.

32. The processor of claim 20, wherein the one or more circuits are to precompute the one or more memory offsets based, at least in part, on the one or more dimensions of the matrix operand.

33. The processor of claim 20, wherein the matrix multiplication is performed by one or more parallel processing subsystems having access to memory in which the one or more memory offsets have been stored.

34. The processor of claim 20, wherein the one or more memory offsets are indicative of a location in storage of one or more operands to a convolution to be performed by performing the one or more matrix multiplications.

35. A method, comprising:

precomputing one or more memory offsets corresponding to one or more locations in a matrix operand, the memory offsets computed based, at least in part, on one or more dimensions of the matrix operand;

storing the precomputed one or more memory offsets to memory of one or more parallel processors; and causing the one or more parallel processors to use the precomputed one or more memory offsets in the memory of the one or more parallel processors to access data corresponding to one or more locations of the matrix operand to perform a matrix multiplication.

36. The method of claim 35, wherein the memory of one or more parallel processors comprises one or more tiles to be operated on by the one or more parallel processors.

37. The method of claim 35, further comprising performing a convolution operation based, at least in part, on the matrix multiplication.

* * * * *